Oct. 30, 1923.
J. R. FLANNERY ET AL
1,472,389
STAY BOLT STRUCTURE
Filed Feb. 16, 1921
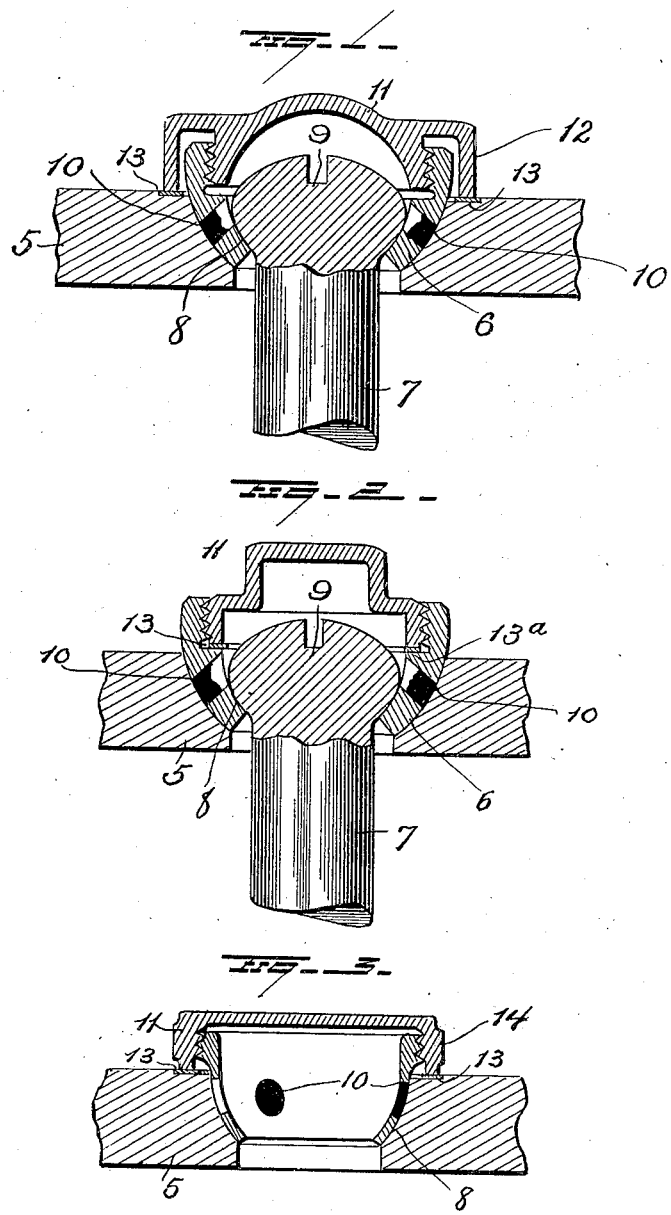
Inventors
J. R. Flannery
E. J. Dodds
By Seymour & Bright
Attorneys Patented Oct. 30, 1923.

1,472,389

UNITED STATES PATENT OFFICE.

JOHN ROGERS FLANNERY, OF PITTSBURGH, PENNSYLVANIA, AND ETHAN I. DODDS, OF CENTRAL VALLEY, NEW YORK, ASSIGNORS TO FLANNERY BOLT COMPANY, OF PITTSBURGH, PENNSYLVANIA, A CORPORATION OF DELAWARE.

STAY BOLT STRUCTURE.

Application filed February 16, 1921. Serial No. 445,453.

*To all whom it may concern:*

Be it known that we, JOHN ROGERS FLANNERY and ETHAN I. DODDS, citizens of the United States, and residents of Pittsburgh and Central Valley, in the counties of Allegheny and Orange and States of Pennsylvania and New York, respectively, have invented certain new and useful Improvements in Stay Bolt Structures; and we do hereby declare the following to be a full, clear, and exact description of the invention, such as will enable others skilled in the art to which it appertains to make and use the same.

Our invention relates to an improvement in staybolt structures, the object being to provide improved means for securing the bolt bearing member to the outer sheet of the boiler and it consists in the details of construction as will be more fully described and pointed out in the claims.

In the accompanying drawings Figure 1 is a view in longitudinal section showing our improvement applied to a boiler sheet and Figures 2 and 3 are similar views of modified forms of the same.

5 represents the outer sheet of a boiler having a bolt opening the wall of which is concaved to form a seat for the curved bearing member 6, the curvature of the contacting surfaces being in the arc of a circle to permit the bearing 6 to be universally adjustable initially, so that the long axis of the bearing 6 may be parallel or coincident with the long axis of the bolt 7. The inner end of the opening in the sheet 5 is of ample size for the passage of the bolt and its adjustment, and the bearing member 6 is provided internally with a curved seat 8 on which the head 9 of the bolt 7 rests and on which it may turn. This bearing member is also provided with a plurality of openings 10 preferably in a plane above the curved seat 8, into which a fusible or welding compound is placed and fused so as to weld the bearing 6 to the sheet 5, or through which the bearing member may be welded to the boiler sheet by any approved method.

In assembling the parts the bearing member 6 is placed in position in the sheet or passed over the smaller end of the bolt, and the inner end of the latter is then passed through the outer sheet 5 until it engages the inner sheet to which it is subsequently secured in the usual manner. Before however the bolt 7 is secured to the inner sheet and after the bearing 6 has been properly adjusted with relation to the bolt, a fusible or welding compound is deposited in the openings or holes 10 and is fused to permanently unite the bearing member to the sheet, or the parts may be fused or welded by any other approved method.

The bearing member 6 is provided at its outer end with internal threads as shown in Figures 1 and 2, or external threads shown in Figure 3, for the attachment of a cap 11.

In the construction shown in Figure 1 the cap is provided with an outwardly and downwardly projecting peripheral flange 12 which resting on a gasket 13 on the outer sheet 5, embraces and covers the outer end of the bearing member 6 and bolt head therein, and prevents the escape of any steam that may leak between the threaded parts of the cap and bearing member.

In Figure 2 the threaded edge of the flange is adapted to rest on a gasket 13ª supported on the annular shoulder in the bearing member and form a steam tight joint, while in Figure 3 the flange 14 of the cap is internally threaded to engage external threads on the upper end of the bearing member 6, the free edge of said flange adapted to rest on a gasket seated on the outer face of the boiler sheet 5.

The construction shown in Figures 1 and 3 are particularly adapted for bolts at right angles to the sheets, as the bearing of the flanges of the cap or the boiler sheet prevents any lateral adjustment of the bearing member, while the form shown in Figure 2 is adapted for use with bolts that are oblique to the plates.

In all instances however the bearing members are permanently secured to the boiler sheet by welding the former to the latter through openings formed in the said bearing members.

It is evident that many slight changes might be resorted to in the relative arrangement of parts shown and described without departing from the spirit and scope of our invention hence we would have it understood that we do not wish to confine ourselves to the exact construction and arrangement of parts shown and described but, Having fully described our invention what we claim as new and desire to secure by Letters-Patent, is:—

1. In a staybolt structure, the combination of a boiler sheet having an opening therein and a bearing member for a stay bolt head within said opening, the said bearing member being provided with an opening in its side and welded to the sheet intermediate the inner and outer surfaces of the latter by welding material introduced into said opening.

2. In a stayblot structure, the combination of a boiler sheet having an opening therein, the walls of said opening being concave, and convex bearing member having an internal seat for the head of a stay bolt and also provided with a hole, the said bearing member being welded to the sheet intermediate the inner and outer surfaces of the latter by welding material introduced into said hole.

3. A bearing member for the head of a stay bolt, having an external bearing face adapted to engage a correspondingly shaped seat in the boiler sheet and provided internally with a bearing for the head of a stay bolt, with a threaded outer end for the attachment of a cap, and with a hole in its wall terminating at the external bearing face of said member and in the plane of the part thereof engaged by the seat in the boiler sheet for receiving welding means by which said bearing member may be permanently secured to said sheet.

4. In a stay bolt structure, the combination of a boiler sheet having a bolt opening therein, a bearing member seated in said bolt opening and provided with a plurality of holes through which it is welded from the inside to said sheet, a stay bolt the head of which is mounted in said bearing member, and a cap screwed to the outer end of said bearing member and bearing against the outer surface of the boiler sheet.

In testimony whereof, we have signed this specification in the presence of a subscribing witness.

JOHN ROGERS FLANNERY.
ETHAN I. DODDS.

Witness:
EDWIN SPENCER RYCE.